June 19, 1956 J. R. LANE 2,751,006
KNIFE-CLAMPING MEANS FOR ROTARY SHEAR
Filed Dec. 12, 1951 2 Sheets-Sheet 1
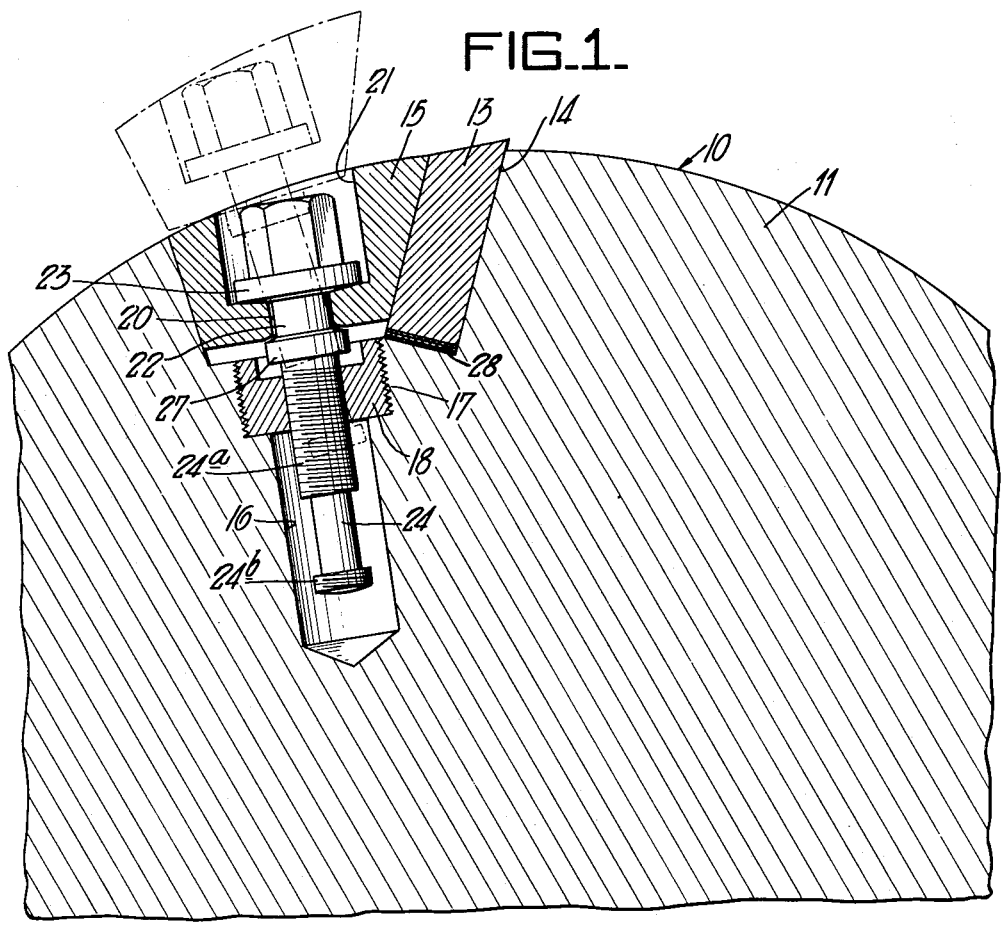
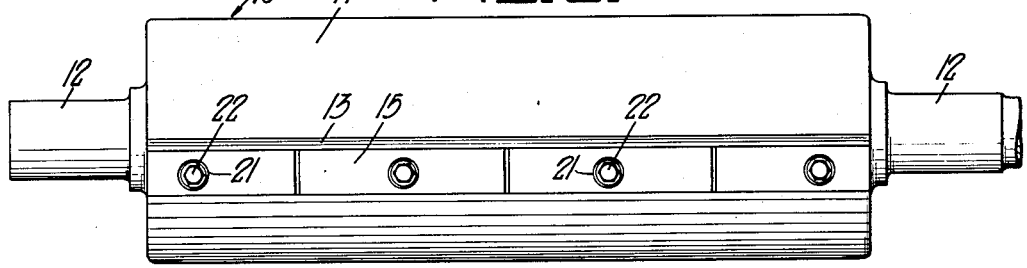
*Inventor:*
JOHN R. LANE,
by: Donald G. Dalton
his Attorney.

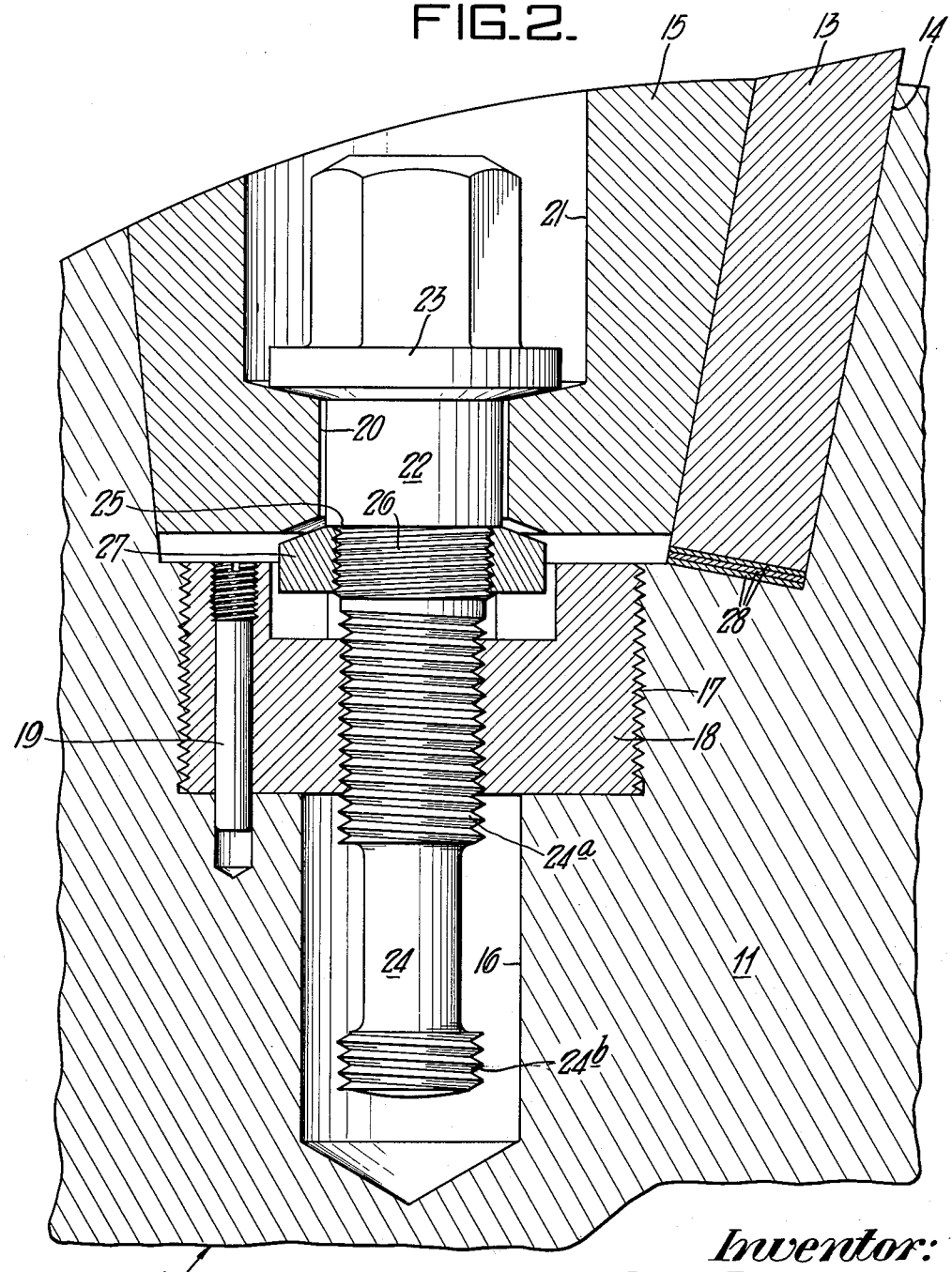

2,751,006

KNIFE-CLAMPING MEANS FOR ROTARY SHEAR

John R. Lane, Pittsburg, Calif., assignor to United States Steel Corporation, a corporation of New Jersey Application December 12, 1951, Serial No. 261,202

2 Claims. (Cl. 164—66)

This invention relates to flying shears of the rotary-cylinder type and, in particular, to means for securing the knives thereof to the cylinders on which they are mounted.

For satisfactory results, the knives of a flying shear must be adjustable and removable but must also be positively held against even minute displacement during operation in order to insure proper coaction in cutting. In high-speed shears, of course, a large centrifugal force is exerted on the knives and this necessitates clamping them very tightly to prevent any possibility of slippage. At the same time, the blade-securing means must be quickly releasable to permit ready replacement of the knives when grinding is needed, since a long line of production apparatus feeding material to the shear must ordinarily be shut down during knife changing.

I have invented a novel clamping means for the knives of rotary shears which adequately meets the foregoing requirements and is characterized by further advantages as well. In a preferred embodiment, I provide a wedging bar adapted to lie alongside the knife in a slot formed in the surface of each rotor or cylinder of the shear, parallel to its axis. The slot has side walls inclined to each other and the wedging bar has a cross section which tapers correspondingly. Clamping screws are inserted through the wedging bar and are threaded into holes spaced along the bottom of the slot. The screws are fitted with collars effective to lift the wedging bar when the screws are backed off.

A complete understanding of the invention may be obtained from the following detailed description and explanation which refer to the accompanying drawings illustrating the present preferred embodiment. In the drawings, Figure 1 is a partial cross-section through a shear or cylinder fitted with the knife-clamping means of my invention;

Figure 2 shows a portion of Figure 1 to enlarged scale; and

Figure 3 is a plan view of the rotor.

Referring now in detail to the drawings, a rotary shear cylinder 10 has a body 11 and trunnions 12 on which it is journaled for rotation in suitable bearings (not shown). The cylinder has a longitudinal knife 13 adapted to coact with the knife of a similar cylinder disposed closely adjacent and parallel thereto, to effect a cutting stroke on material passing therebetween. The knife is a flat bar with one edge beveled and is received in a slot 14 in the surface of the cylinder parallel to the axis thereof. The slot has side walls which converge inwardly. A wedging bar 15 having a cross-section tapering to correspond with that of the slot, fits therein adjacent the knife and is effective to bind the latter frictionally between itself and a wall of the slot. The wedging bar is sectionalized as shown in Figure 3 to permit individual backing off of the clamping screws referred to hereinafter, without binding.

Radial bores 16 are formed in the body 10 of the shear cylinder extending inwardly from the bottom of slot 14, and in spaced relation therealong. The bores 16 are counterbored as at 17 and tapped to receive bushings 18. A hole is drilled through each bushing and adjacent the edge thereof and into the cylinder to receive a locking pin 19. The pin is threaded at its outer end so it can be screwed into the tapped outer end of the hole.

Bar 15 has holes 20 therethrough in alinement with holes 16. Holes 20 are counterbored to form sockets 21. Clamping screws 22 are inserted into the sockets, through holes 20, and screwed into bushings 18. Each screw head has a flange or shoulder 23 bearing on the bottom of socket 21. A portion 24 of the shank of each screw, spaced inwardly of the entering end thereof, is turned down to a reduced diameter leaving separated threaded portions 24a and 24b for a purpose which will appear presently.

Each screw shank has a shoulder 25 spaced from flange 23 by a distance slightly greater than the difference between the median thickness of bar 15 and the median depth of the socket 21. Inwardly of the shoulder, the screws have a portion 26 provided with a thread preferably of a different pitch and opposite hand from those of the thread on the remainder of the shank. A collar 27 which may be simply a nut, is threaded onto portion 26 of each screw shank and turned home against shoulder 25. The collars serve to lift the bar 15 out of slot 14 when screws 22 are backed off.

It will be evident from the foregoing that, when the knife 13 and wedging bar 15 are disposed side-by-side in slot 14 and screws 22 are drawn tight, the bar will grip the knife between itself and one wall of the slot under tremendous pressure, sufficient to bind the knife frictionally in the slot against any possibility of slippage under centrifugal force, even at high speeds of rotation. The radial adjustment of the knife may be varied by shims 28. When it is desired to change the adjustment or replace the knife, it is only necessary to back off the screws 22. As stated above, collars 27 forcibly lift the bar, in case it tends to stick in the slot. When the collars engage the bar, on backing the screws off, friction tends to seat the collars tightly against shoulders 25. When the screws have been retracted so that their threaded portions 24a are out of the bushings, the screws may be tilted and the bar swung back to an out-of-the-way position (shown in dotted lines in Figure 1) to permit free access to the knife, in case it has to be hammered or pried to release it. The threaded portions 24b at the extreme end of the screws hold them captive and prevent their removal accidentally when changing knives but permit removal if necessary as in case of damage to or breakage of a wedging bar or screw. This also holds the bar in position for ready replacement and insures against interchanging the wedging bars of the two cylinders of a shear.

It will be apparent from the foregoing that the knife-clamping means of my invention effectively holds the knife, when set in place and adjusted, against even a minor displacement, despite the heavy centrifugal force developed on rotation of the cylinders at high speed. At the same time, my improved clamping means can be quickly released to permit removal and replacement of the knife with a minimum loss of operating time. The entire change can be made from one side of the shear so the cylinder need not be partially rotated as has been necessary in certain cases heretofore. The parts of my device, furthermore, are few and simple, requiring only ordinary turning, drilling, boring and tapping operations, except for the wedging bar and the slot in the shear cylinder.

Although I have disclosed herein the preferred embodiment of my invention, I intend to cover as well any change or modification therein which may be made without departing from the spirit and scope of the invention.

I claim:

1. In a rotary shear cylinder having in its surface a slot parallel to the axis of the cylinder, with inwardly converging sides, the combination with an elongated knife in said slot abutting one of said sides and an elongated wedging bar with inwardly converging sides abutting said knife and the other side of said slot, respectively, said cylinder having at least one bore extending inwardly thereinto from the bottom of the slot, the outer portion of the bore wall being tapped, of a clamping screw extending through said bar and threaded into said tapped portion of said bore, the inner portion of the bore being larger in diameter than the shank of the screw and a portion of the length of said threaded portion spaced from the entering end thereof being turned down to a diameter smaller than that of said threaded portion, said turned-down portion of the screw having a slightly greater extent axially of the screw than the axial extent of said tapped portion of said bore, and means carried by the screw inwardly of said bar but outwardly of the portion of the screw which is threaded, effective to force the bar outwardly when said screw is backed off.

2. The shear cylinder defined by claim 1 characterized by a bushing seated in the outer portion of said bore, said bushing having therein said tapped portion of said bore wall.

References Cited in the file of this patent
UNITED STATES PATENTS

| | | |
|---|---|---|
| 332,715 | Hoyt | Dec. 22, 1885 |
| 886,332 | Sibley | Apr. 28, 1908 |
| 1,250,597 | Kyle | Dec. 18, 1917 |
| 1,487,682 | Leppert | Mar. 18, 1924 |
| 1,751,563 | Stinger | Mar. 25, 1930 |
| 1,866,855 | Kirsten | July 12, 1932 |
| 2,180,204 | Hallden | Nov. 14, 1939 |
| 2,203,738 | Nash | June 11, 1940 |
| 2,242,887 | Holdgate et al. | May 20, 1941 |
| 2,264,305 | Gibbs | Dec. 2, 1941 |
| 2,395,377 | MacLean | Feb. 19, 1946 |